June 30, 1970  J. R. PINKHAM  3,517,479
WRAPPING MACHINE
Filed June 25, 1968  4 Sheets-Sheet 1
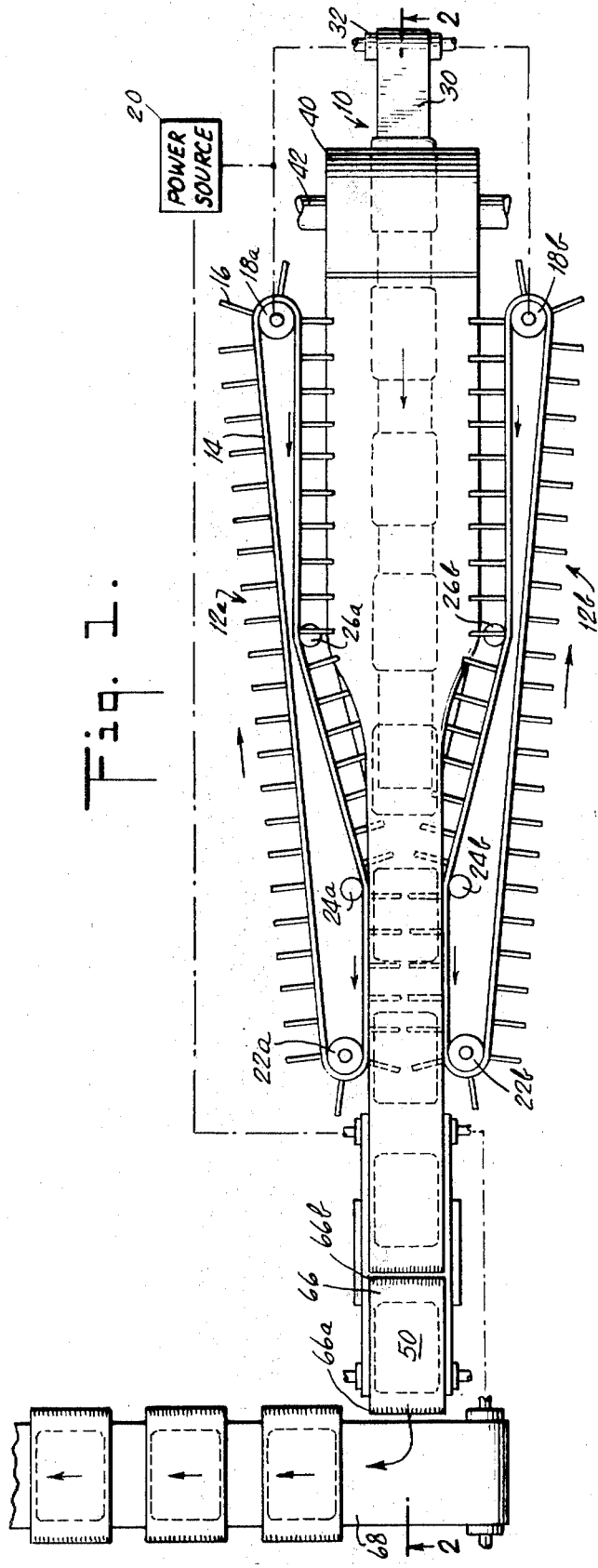
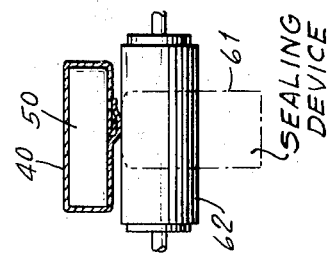
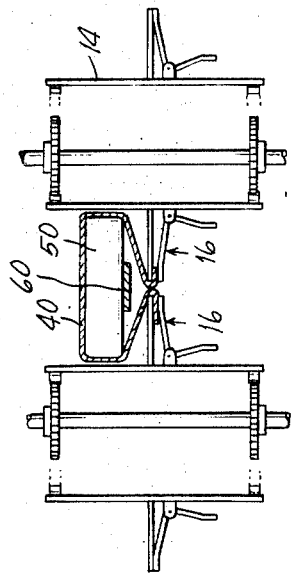
INVENTOR.
JESSE R. PINKHAM
BY Lester W. Clark
ATTORNEY

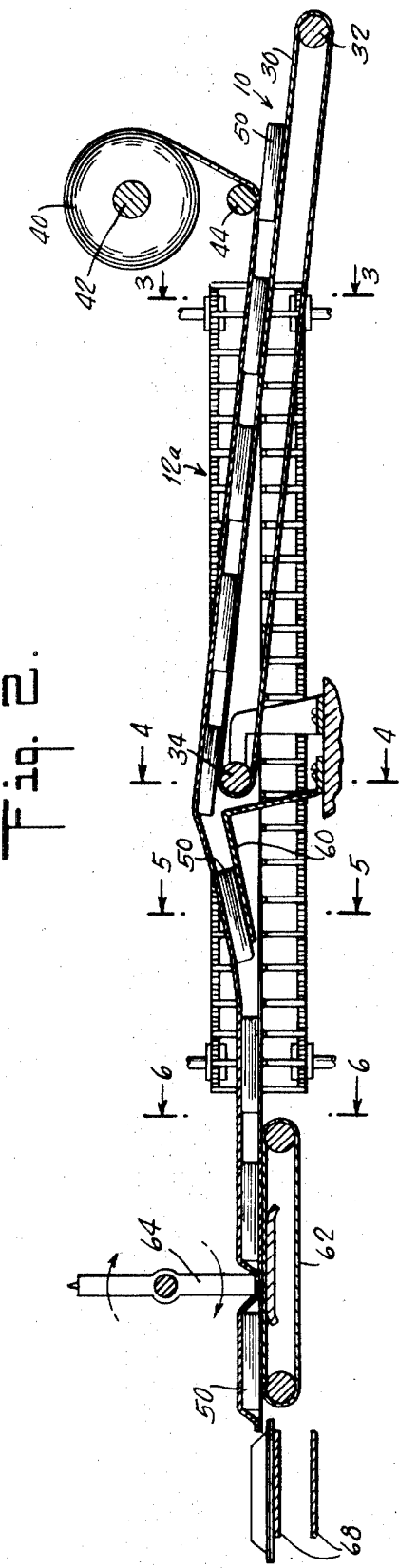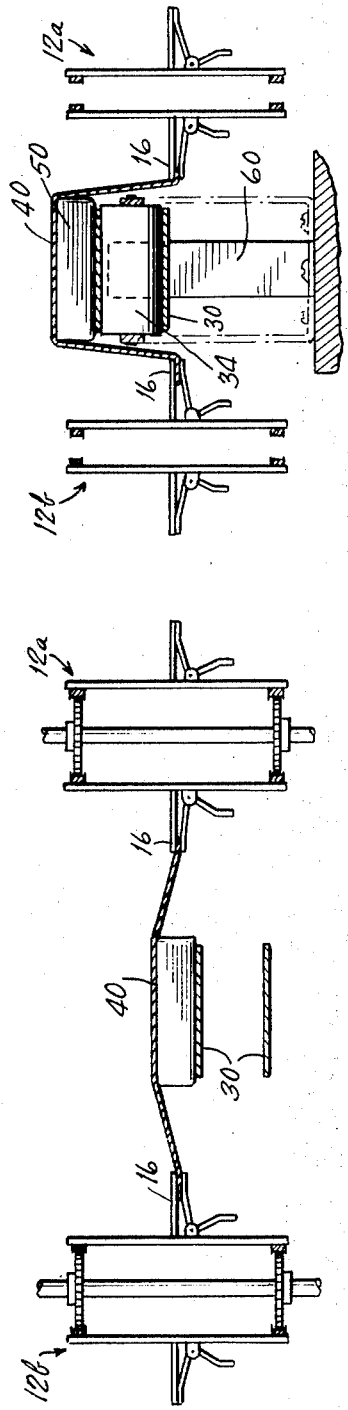

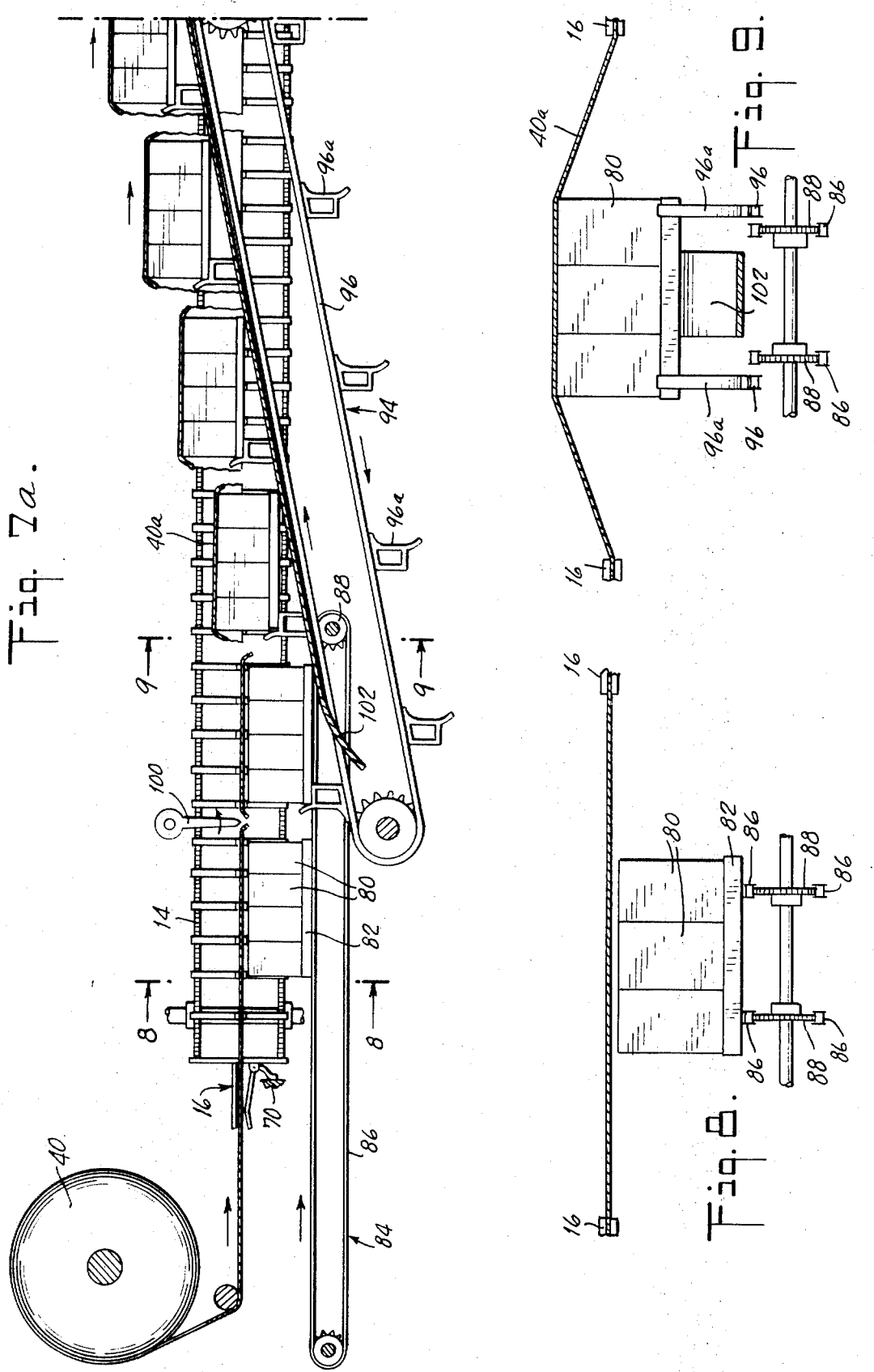

June 30, 1970  J. R. PINKHAM  3,517,479
WRAPPING MACHINE
Filed June 25, 1968  4 Sheets-Sheet 4
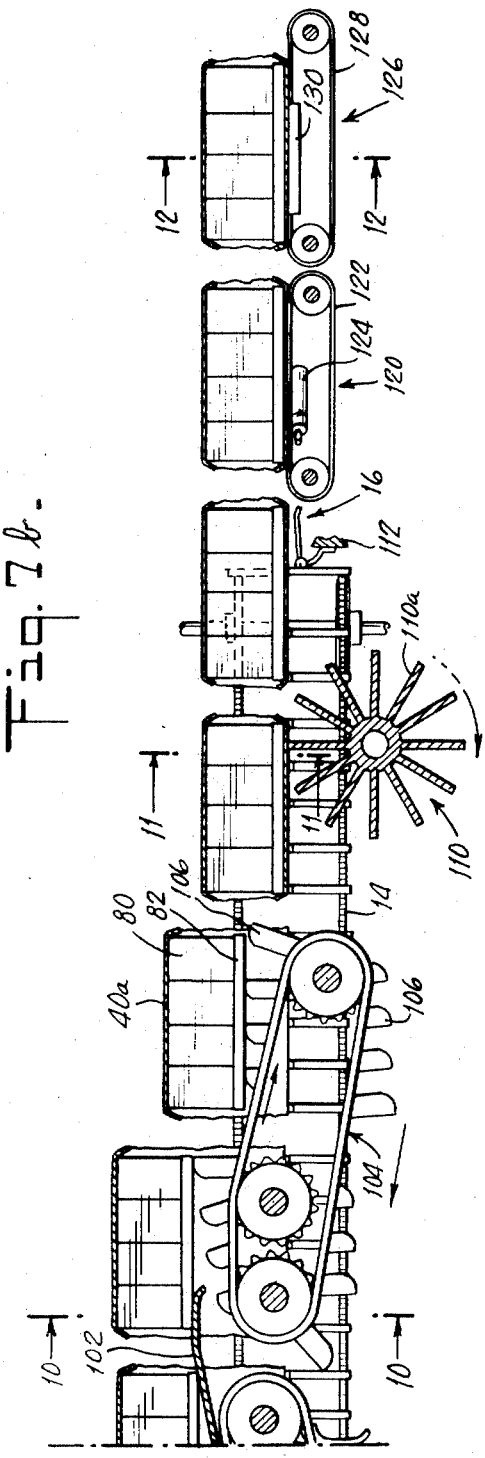
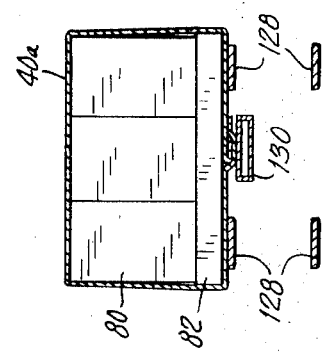
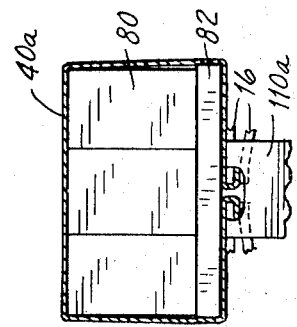
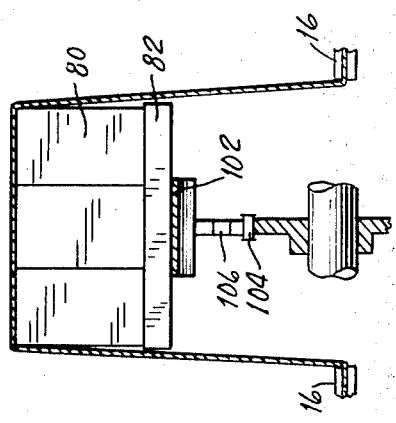

United States Patent Office 3,517,479
Patented June 30, 1970

3,517,479
WRAPPING MACHINE
Jesse R. Pinkham, Winston-Salem, N.C., assignor to R. J. Reynolds Tobacco Company, Winston-Salem, N.C., a corporation of New Jersey
Filed June 25, 1968, Ser. No. 739,753
Int. Cl. B65b 9/12, 51/30
U.S. Cl. 53—182
17 Claims

ABSTRACT OF THE DISCLOSURE

An automatic continuous motion overwrap machine capable of wrapping irregular shaped objects or articles. The machine embodies a technique according to which a film of plastic material or the like is held taut by a conveying means and is moved in a path which is at an angular relationship with the path of conveyance of the articles, whereby the film is stretched laterally to a considerable extent.

In one form of the machine, as the plastic film is payed off from its bobbin, the side edges are engaged by tenter clips attached to chains running horizontally at opposite sides of the film. The articles to be wrapped are moved underneath the film along a conveyor belt which runs at the same speed as the wrapping film. The belt is inclined such that the articles are moved upwardly and in so moving stretch the film. After it has been stretched, the edges of the film are brought around the articles by the tenter clips which also serve at the final stages to support the articles.

The techinque can be practiced by completely overwrapping articles; or it can be applied to the bundling of articles, in which case they are snugly held together but without requiring complete enclosure. The articles are either overwrapped such that they are entubed in a series or string, or they are individually wrapped in accordance with other aspects and features of the disclosure.

BACKGROUND, OBJECTS AND SUMMARY OF THE INVENTION

This invention relates to improvements in wrapping machines in which the articles to be wrapped are continuously moved and are enclosed with a wrapper of film-like material.

In one aspect the present invention is concerned with an automatic continuous motion overwrap machine, and to the method employed thereby, for wrapping odd and uneven shaped objects or articles with a stretch type film such as film of polyvinyl chloride.

In another aspect, the present invention is also concerned with a wrapping arrangement which permits bundling of groups of articles. In this connection it is to be noted that the reference to bundling implies that the articles are not, as in the more conventional situation, completely encased by folding and sealing at the ends thereof, but are simply surrounded and held together by a wrapper so that groups or bundles of these articles will remain intact.

In the first aspect noted above, the concept of the present invention is embodied in a machine which is used for overwrapping articles, more specifically, in overwrapping products such as meat, fowl, vegetables and fruits which are normally placed in trays for subsequent consumer purchase. Such items are of particular concern because they are irregular in shape and consequently certain problems are introduced in their packaging which the present invention is designed and adapted to overcome. One of the difficulties in handling the above-noted irregular items stems from the fact that the current practice is to overwrap the trays in which they are held with a loose fitting film, for example, of shrinkable plastic material. The wrapped tray and its contents are then passed through a heat tunnel which acts to shrink the film material to conform to some degree to the shape and size of the contents. However, a major difficulty with this method is that the film, as it extends over the contents, is in some spots in actual contact therewith, while in other areas it is suspended in mid air. As a consequence, the part of the film that is in contact with the product is kept cooler so that the cover, in its complete or overall extent, does not shrink uniformly. Therefore, the package is not as neat in appearance as would be desired and is certainly not as neat as one carefully wrapped with a stretch type plastic film.

Another disadvantage associated with the practice of wrapping items with a shrink film is the need for a heat tunnel for properly shrinking the film material, this apparatus being space-consuming, expensive, and requiring warm-up prior to usage. Yet another disadvantage is that shrink film is more expensive generally than stretch film.

Accordingly, it is a primary object of the present invention to overcome the difficulties and disadvantages present in prior art wrapping techniques.

Another object is to make feasible the continuous overwrapping of irregular shaped items with a stretch type film.

One of the primary requirements in the design of a wrapping machine that is to handle stretch film is that it be able to overcome the problem of dimensional instability, which is the very characteristic that makes the film stretchable. Compounding the difficulties which attend the use of stretch film in overwrapping objects is the fact that it clings to itself and also to most materials with which it comes in contact.

Accordingly, another object of the present invention is to surmount the aforesaid difficulties which have led to a failure to exploit the advantageous characteristics of stretch type film for the contemplated purposes.

Briefly stated, then, in one of its primary aspects the present invention provides that the stretch type film material is held in a taut condition. It is not tucked or plowed as by the use of conventional techniques. The invention features a means or a mechanism which overcomes the previously stated problems and takes its form based on a tenter frame principle which enables holding the film tautly as it is payed off from the roll or bobbin and enables continuously holding it during the wrapping procedure. In other words, the film is not allowed to become fouled up but is contantly held as it is drawn from the source of supply. It is held in such taut condition and is brought around so as to surround the articles to be wrapped. Moreover, this mechanism produces confrontation of the side margins of the film as the film is brought around the articles; it also acts to support the articles during the final stages of the technique.

Broadly considered, the present invention provides a machine which includes in combination a means for feeding in a predetermined direction spaced articles to be wrapped, and conveying means coating with the feeding means and arranged so that it has a path of movement angularly related to the feeding means such that a sheet of film-like material is conveyed over the articles whereby the film is stretched to a considerable extent; that is, to an extent sufficient to provide for completely surrounding the articles. The conveying means, which is in the form of a tenter frame comprising a pair of chains to which tenter clips are attached, also acts continuously to carry the sheet or sheets of film around the articles such that the margins of the film faces come into contact.

Associated with the above-noted, more essential, mechanisms are a number of other devices for holding together the faces of the film that have been brought into contact. A conventional sealing device is utilized for holding and tucking together the faces of the film so that they will not separate when they are released from the grasp of the tenter clips. Furthermore, a means is provided for continuously sealing the plastic film. This operation follows the release of the film from the tenter clips and after the contacting margins have been folded over. This continuous sealing operation is preferably effected by contact with a heated conveyor belt.

Since, in accordance with the above-described aspect of the present invention, the complete operation results in producing a string of articles encased in an elongated sheet of overwrap material, there is also provided a means for cutting the elongated sheet to produce an individual wrapper for each of the articles.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 1 is a top plan view of one embodiment of a wrapping machine in accordance with the present invention.

FIG. 2 is an elevation view of that same machine.

FIG. 3 is a sectional view, along the line 3—3, at the upstream end of the machine and particularly illustrating the beginning of the overwrapping of an item.

FIG. 4 is a sectional view taken on the line 4—4, which is further downstream, that is, further along in the wrapping process according to the present invention.

FIG. 5 is another sectional view, taken on the line 5—5, and particularly illustrating the carrying under of the wrapping material.

FIG. 6 is a sectional view taken on the line 6—6 and particularly illustrating the sealing stage in the process.

FIGS. 7a and 7b taken together, illustrate, in an elevation view, a second embodiment of a machine and is in accordance with another aspect of the present invention.

FIGS. 8, 9, 10, 11 and 12 are sectional views taken at various stages in the wrapping process in accordance with the other embodiment.

DESCRIPTION OF THE EMBODIMENTS

First embodiment

Referring now to FIGS. 1–6, there are shown several views of the first embodiment of a machine for overwrapping articles in a continuous manner, and particularly for wrapping or encasing a series of articles with an elongated sheet of film. Considering the wrapping machine in respect of its more basic or essential components, these comprise the feeding means designated 10 for feeding a plurality of articles to be wrapped and a conveying mechanism or means 12 for holding taut the wrapping material which is in the form of a plastic film or the like.

In the particular embodiment illustrated here, the feeding means 10 is shown as inclined upwardly with respect to the horizontal at an angle of the order of 20°. The conveying mechanism takes the form of a tenter frame divided into two symmetrical sections 12a and 12b disposed along opposite sides of the longitudinal axis. Each of the sections 12a and 12b comprises an endless double chain 14 to which are attached a series or group of tenter clips 16. Each of the clips 16 comprises a pair of jaws which are normally biased to the closed position and are opened at the appropriate times by a suitable cam, not shown here, for the purposes of grasping and releasing the side edges of the film.

The endless chains 14 of the tenter frame sections 12a and 12b are driven by the drive sprockets 18a and 18b which are connected to a suitable power source 20 for actuation thereby. The power source 20, as is well understood, is also connected with the various other components in such manner as to effect synchronization in the driving of these other components. The endless chains 14 are also engaged by sprockets 22a and 22b and are guided in their lateral movement by appropriately spaced guide rolls 24a, 26a and 24b, 26b for particular purposes to be explained.

The feeding means 10 is illustrated here as comprising a belt 30 which is driven by the roll 32 at its one end and by the roll 34 at the other end.

A roll of film type wrapping material 40, such, for example, as polyvinyl chloride stretch film, is mounted on a shaft 42 and the film is fed over a guide pulley 44. The film material 40 is payed off from its bobbin or roll by being grasped at its margins or side edges by the tenter clips 16. As each of the succeeding pairs of jaws, constituting the tenter clips 16, at opposite sides of the sheet approach the edges of the sheet, the jaws are opened and then allowed to close thereby firmly engaging the opposite side edges of the sheet.

Power from the power source 20 is constantly applied to the drive rollers 18a and 18b so that the chains 14 are continuously driven. It will be appreciated that as a consequence, the problem of film payoff is minimized. The speed of conveyance of the sheet of film is selected to be substantially the same as the speed of the belt 30.

In the particular embodiment illustrated in FIGS. 1–6, the conveyor belt 30 is disposed at a convenient angle to the horizontal, such as 20°, and the chains 14 of the tenter frame assembly are moved in a direction substantially on the horizontal. As a result, when the spaced articles 50 are moved along the belt, they move upwardly against the film and in so moving stretch it to a considerable extent. This can best be appreciated by reference to FIGS. 3 and 4 which show several stages in the progression of the articles upwardly and in movement against the film which is being held tautly by the clips 16.

At an appropriate point, that is, at a point where the movement of the articles has caused sufficient stretching of the plastic film, the oppositely disposed clips on the chains 14 at the opposite sides of the film, begin to converge and in so doing bring the film downwardly to a position which can be appreciated by reference to FIG. 4. At this stage, the highest point in the travel of the articles has been reached. This point corresponds to the downstream end of the conveyor belt 30.

After the articles have been elevated to their highest point they are then supported by a narrow plate 60, the conveyor belt having terminated. A given article 50 is temporarily supported on this plate until the tenter clips 16 have progressed sufficiently inwardly for the article to be supported by them. By referring to FIG. 5, it will be seen that a point is reached where the given article is about to leave the plate 60, at which point the faces of the film are coming into contact with each other at their margins by reason of the inward movement of the tenter clips 16.

The next stages, following the inward movement of the wrapping material such that its margins have come into contact, are the tucking together of the margins and the sealing thereof so that the enclosure is completed. Then, the enclosed string or series of articles that have been surrounded by the film are separated from each other by cutting traversely through the plastic film between adjacent articles 50.

For the purpose of tucking together the margins, a conventional sealing device 61, shown by broken lines in FIG. 6, is utilized. In order to produce, in a continuous manner, the finished sealing of these margins a heated conveyor belt 62 is provided at the downstream end of the tenter frame. Thus, when a given article is released from being supported by the tenter clips 16, it is fed onto this belt. As best seen in FIG. 6, the margins have been brought together by the sealing device 61 such that one edge of the film overlaps the other so that it can bond to the opposite edge in shear. Continuous sealing is effected by heat from the belt 62.

As noted previously, the sequence of steps already performed results in a string of spaced articles enclosed in a continuous tube of overwrap film material. The mechanism 64, which comprises a cross sealer and cutter acts to sever and seal halfway between two adjacent articles.

In order that the apparatus may be adapted to perform the above-described sealing and cutting operation on different lengths or articles or items, it can be provided that a feeler or photo sensor respond to different lengths of articles to provide the cross sealing and cutting operation at the appropriate times.

After the articles have been wrapped, as described, there results an individual wrapper 66 having a leading end 66a and a trailing end 66b for each of the packaged items. These items can be considered finished, as is; that is, these leading and trailing ends can be left as they are and the items are simply conveyed, as shown in FIG. 1, by another conveyor belt 68 having a direction of movement transverse to that already described. However, if preferred, these leading and trailing ends can be stretched, tucked under and sealed by an arrangement substantially similar to that already described. In other words, the items seen being conveyed by the conveyor 68 can be sent to another tenter frame mechanism adapted to grasp the leading and trailing ends, which now may be considered as sides of the wrapper, and these sides will be brought around in substantially the same manner as described.

Second embodiment

Referring now to FIGS. 7–12, there are depicted several views of an embodiment relating to a different aspect of the present invention. The machine here shown is adapted to permit bundling of articles and, as such, embodies an alternate concept to the concept already described. By "bundling" is simply meant that groups of regular items, such as standard packaged goods, are overwrapped in order to hold them snugly together, but without requiring complete enclosure. Typically, the ends of the groups of items are left open, that is, the wrapping material is not sealed at the ends.

It will be seen by reference to FIGS. 7a and 7b that the same essential mechanisms as were found in the first embodiment are included in the present embodiment. Thus, a source of supply of wrapping material in the form of a roll of plastic film 40 is provided and the film is drawn from its roll by being grasped at its side edges by the tenter clips 16 provided on the tenter frame sections disposed along opposite sides of the film. It should be noted here that one of the tenter clips 16 is shown in its open position, having been actuated into this position by the cam 70. This actuation, of course, takes place just before the given tenter clip engages the side edge of the film.

In the particular embodiment here illustrated, a group of regular shaped items 80 are shown disposed in a tray 82, and are fed to be wrapped by a feeding means which here takes the form of separate endless conveyors 84 and 94. The conveyor 84 comprises a spaced pair of parallel chains 86 for support of groups of items to be bundled. The pair of chains 86 is driven by pairs of sprockets 88, the downstream pair being shown in FIG. 8. Similarly, the inclined conveyor 94 comprises pairs of conveyor chains 96 suitably driven by sprockets. The chains 96 have a greater spacing between them than the spacing of chains 88, as can be appreciated by reference to FIG. 9.

It will be especially noted that, unlike the first embodiment, it is provided here that before the groups of items are to be conveyed upwardly against the tautly held plastic film 40, the film is cut to provide an individual sheet or web 40a for each group. The cutting of the individual webs 40a is performed by the hot wire cutter 100 which is at a location just beyond a point where the tenter clips come into engagement with the film 40.

The groups of items to be bundled are moved by the conveyor 84 in such longitudinal spaced relationship that the distance from the trailing face of one group of items to the leading face of the next group is twice the amount of overhand required for each web of wrapping material. This allows for one cut between the groups and, consequently, there is no scrap.

After the severance of the film 40 by the hot wire cutter 100, a given group of items moves from the conveyor 84 onto the inclined conveyor 94. The tenter clips 16 continue to run on the horizontal and, thus, there is produced the desired stretching of the film, as may be seen in FIG. 9. As a given group of items leaves the conveyor 84, its front portion comes into contact with the inclined ramp 102. Each of the conveyor chains 96 is provided with a series of outwardly projecting spaced lugs 96a, pairs of which fall in behind each group of items and operate to move the group upwardly in parallel relationship with the horizontal. It will be appreciated that such an arrangement is not absolutely necessary, but it permits of a much more compact machine which is still a continuous motion machine.

In similar fashion to the operation described in connection with the first embodiment, the movement upwardly of a given group of items causes stretching of its associated web 40a of plastic film material. Thus, at its highest point of elevation, it can be appreciated by reference to FIG. 10 the film has been stretched to its maximum point. When this point is reached, the items move from the ramp 102 and are carried downwardly by the next conveyor 104, whose chains are provided with an outwardly projecting series of spaced lugs 106 of different length, whereby the group of items may be lowered in parallel relation to the horizontal. As was the case before in the first embodiment, the path of travel for the tenter clips is arranged such that they converge. In this embodiment the tenter clips 16 converge at a point just beyond the downstream end of the conveyor 104. It may be seen by reference to FIG. 11 that the tenter clips have at this point moved inwardly with respect to the longitudinal axis such that the side edges of the web 40a have approached each other preparatory to having the faces brought together and then folded back for final sealing.

The margins of the film are brought into confronting relation and are initially held together by application of the spot sealer 110. The operation of the spot sealer is such that its spokes interdigitate with the spaced converging tenter clips and effect the required temporary sealing. This sealing or holding together is necessary to prevent the margins of the film from separating once the film has been released from the grasp of the tenter clips 16. The opening of the jaws of the tenter clips 16 can be seen in response to the actuation of cam 112.

In order to insure thorough folding back of the margins of the film against the bottom surface of the package or bundle, the plowing means 120 is provided comprising a belt 122 and a roller 124, the latter serving to make contact with the margins of the film at the bottom of the bundle. Following this folding back of the margins, continuous sealing of the margins to the surface of the web is accomplished by means of the continuous sealer 126 which, as illustrated, takes the form of a pair of belts 128 and a sealing device 130 which is disposed immediately below the folded margins and may be best seen in FIG. 12.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the

What is claimed is:

1. A wrapping machine for continuously wrapping a plurality of moving articles comprising:
   means for feeding spaced articles in a predetermined path of movement;
   unitary means for conveying a sheet of film over said articles, the path of movement of said sheet of film being at an angular relationship to the path of movement of said spaced articles so as to stretch the film; said unitary means including means for continuously engaging the side edges of the film to convey same, while moving the film around the articles to be wrapped to bring the margins of the film into contact;
   means for continuously sealing the film along the bottom of said articles;
   means for cutting said film transversely of the path of movement of said articles so as to provide an individual wrapper for each of the articles.

2. A wrapping machine as defined in claim 1, further including means for holding together the faces of the film at their contacting margins.

3. A wrapping machine as defined in claim 1, in which said means for feeding spaced articles and said means for conveying a sheet of film material move at substantially the same speed.

4. A wrapping machine as defined in claim 1, in which each of said articles is irregular in shape and comprises a tray and its contents.

5. A wrapping machine as defined in claim 1, in which each of said articles comprises a group of regular shaped items.

6. A wrapping machine as defined in claim 1, in which the means for cutting the film transversely is situated upstream of the point at which the film is carried around the articles.

7. A wrapping machine as defined in claim 1 in which said means for feeding spaced articles includes a conveyor inclined upwardly from the horizontal.

8. A wrapping machine as defined in claim 1, in which said means for feeding comprises at least two conveyors, one of them being on the horizontal and the other inclined upwardly from the horizontal.

9. A wrapping machine as defined in claim 8, wherein each of said conveyors comprises two endless chains, and further including a ramp situated between the chains of the inclined conveyor for enabling the carrying of the articles upwardly and parallel to the horizontal.

10. A wrapping machine as defined in claim 9, wherein each of the endless chains of said second conveyor includes a series of spaced lugs.

11. A wrapping machine as defined in claim 1, wherein said means for conveying a sheet of film over said articles comprises a tenter frame divided into two sections, each section being disposed along opposite side edges of said film.

12. A wrapping machine as defined in claim 11, wherein each of said tenter frame sections comprises an endless double-chain arrangement and a series of tenter clips attached to said double-chain, said tenter clips engaging the side margins of said film.

13. A wrapping machine as defined in claim 12, wherein said means for conveying said film material includes means for converging said tenter clips so as to bring the film around the articles to be wrapped and to bring the side margins into confronting relation.

14. A wrapping machine as defined in claim 12, further including means for opening the normally closed tenter clips so as to engage and disengage the film.

15. A wrapping machine as defined in claim 1, wherein said means for continuously sealing the film along the bottom of said articles comprises a heated belt.

16. A wrapping machine as defined in claim 12, wherein each of the tenter frame sections includes sprockets engaging said chains and guide rolls for providing converging of the tenter clips so as to bring the film around the articles.

17. A wrapping machine as defined in claim 1, wherein said means for conveying said film is arranged such that the film is conveyed on the horizontal and the articles are fed at an inclination upwardly from the horizontal such that they cause stretching of the film.

References Cited
UNITED STATES PATENTS

| | | | |
|---|---|---|---|
| 2,603,928 | 7/1952 | Clark | 53—180 |
| 2,959,902 | 11/1960 | Heller et al. | 53—180 |
| 3,184,896 | 5/1965 | Peppler | 53—180 |

THERON E. CONDON, Primary Examiner

H. A. KILBY, Jr., Assistant Examiner

U.S. Cl. X.R.

53—180

UNITED STATES PATENT OFFICE
CERTIFICATE OF CORRECTION

Patent No. 3,517,479        Dated June 30, 1970

Inventor(s) Jesse R. Pinkham

It is certified that error appears in the above-identified patent and that said Letters Patent are hereby corrected as shown below:

Column 2, line 51, change "contantly" to -- constantly --.

Column 2, line 61, change "coating" to -- coacting --.

SIGNED AND
SEALED
NOV 10 1970

(SEAL)
Attest:

Edward M. Fletcher, Jr.
Attesting Officer

WILLIAM E. SCHUYLER, JR.
Commissioner of Patents